Feb. 20, 1962 W. B. OSBORNE 3,021,925
ONE-WAY BRAKE
Filed June 4, 1958

INVENTOR.
William B. Osborne
BY
Gust & Irish
Attorneys

United States Patent Office 3,021,925
Patented Feb. 20, 1962

3,021,925
ONE-WAY BRAKE
William B. Osborne, 2811 Godfrey Ave., Muncie, Ind., assignor of one-third to George A. Gust and one-third to Robert G. Irish, both of Fort Wayne, Ind.
Filed June 4, 1958, Ser. No. 739,919
11 Claims. (Cl. 188—82.3)

The present invention relates to a one-way brake, and more particularly to a brake which provides for unrestricted rotation of a member in one direction and locks such member against rotation in the opposite direction.

Brakes of the type which permit a member to rotate freely in one direction but locks the member against rotation in the opposite direction are well-known in the art, such brakes utilizing torsion springs which lock the member against rotation in one direction but frees the member for rotation in the opposite direction, as well as the well-known inclined plane-roller combination which performs the same function. This invention relates to the same type of device wherein two members are freely rotatable relative to each other in one direction but are locked against rotation for the opposite direction. Such brakes are commonly used in different machine environments, and are especially adapted for use in automotive torque converters. Since the brake in such torque converters must withstand relatively great forces, considerable difficulty has been experienced in the past in obtaining a brake having a suitably long operating life. It is thus important that the brake be strong and durable so as to achieve a trouble-free operating life of the torque-converting mechanism.

It is therefore an object of this invention to provide a brake which is relatively small in size but which is durable and substantially trouble-free in operation.

It is another object of this invention to provide a brake which can handle relatively high torques without experiencing any unusual wear which would tend to shorten the operating life thereof.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 3:
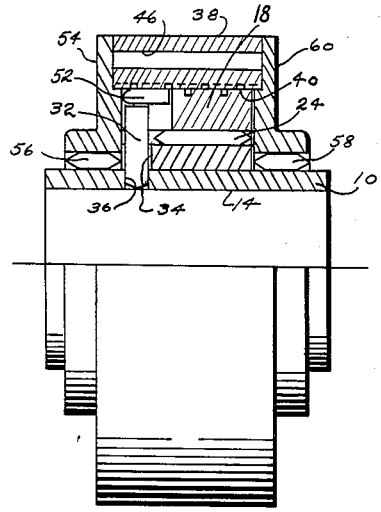
Figure 1:
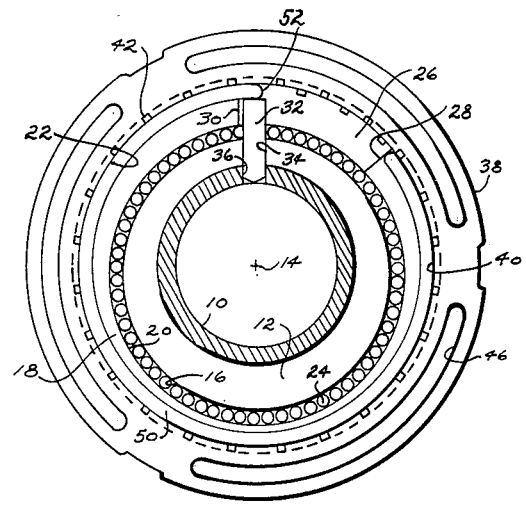
Figure 4:
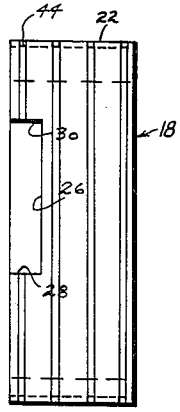
Figure 2:
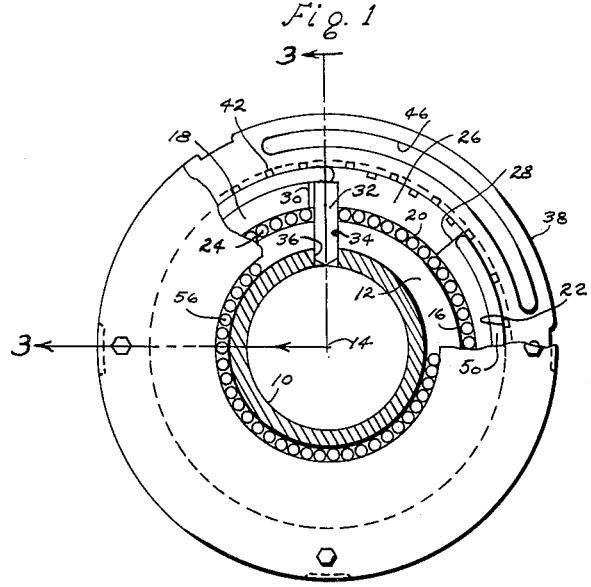

In the drawings:
FIG. 1 is a side view of one embodiment of this invention with the side plates removed;
FIG. 2 is a similar view with the side plates in place but partially broken away for clarity of illustration;
FIG. 3 is a partial sectional view taken substantially along section line 3—3 of FIG. 2; and
FIG. 4 is a side view of the outer eccentric ring thereof.

Referring to the drawings, a stationary tubular shaft 10 has a cylindrically shaped steel ring 12 secured thereon. Some means is provided for preventing relative rotation between this ring 12 and the shaft 10, such as by welding or bolt and screw fastenings. Other means may be provided as will become apparent from the following description. The outer surface of this ring 12 is cylindrical and eccentric with respect to the shaft axis 14, the center of this surface 16 being offset from the shaft axis 14 approximately .060 of an inch for an outer diameter of approximately 1½ inches for the shaft 10 and an outer diameter of approximately 2⅛ inches for the ring 12.

Surrounding the eccentric ring 12 is a second cylindrically shaped ring 18 having an inner eccentric surface 20 which is complementary to the eccentricity of the ring surface 16. The outer peripheral surface 22 of the ring 18 is preferably cylindrical and is concentric about the shaft axis 14.

Interposed between the two eccentric surfaces 16 and 20 are a plurality of axially extending spacer or needle bearings 24 which provide for limited rotational movement between the two rings 12 and 18. The bearings are of such diameter as to prevent any radial looseness of the ring 18 with respect to the ring 12.

As seen more clearly in FIG. 4, a slot or recess 26 having opposite end surfaces or abutments 28 and 30, respectively, is provided in the side of ring 18 and receives the upper end of a stop pin 32 (FIGS. 1 and 3) which passes through a slot 34 in the inner ring 12 and into a companion, press-fitting aperture 36 in the shaft 10. The slot 34 is of approximately the same width as the pin 32 for securing the ring 12 against movement with respect to the shaft 10. The outer end of the pin 32 is selectively engageable with the end abutments 28 and 30, respectively, on the outer ring 18 so as to provide for only limited relative rotation between the two rings 12 and 18.

Encircling the outer ring 18 is a cylindrically shaped drum 38 having an inner peripheral surface 40 only slightly larger in diameter than the outer peripheral surface of the ring 18. Circumferentially and axially extending oil-removing grooves 42 and 44 are provided in the adjacent peripheral surfaces of the drum 38 and ring 18, respectively, for the purpose of collecting and removing any oil or foreign matter which might interfere with any frictional gripping action between the ring and drum.

The drum 38 is provided with three circumferentially extending and spaced hollow sections 46 to weaken slightly the drum in these areas so as to permit the drum to deform under the higher torques which may be applied to the brake.

A C-shaped clutch ring 50, which preferably is formed of spring wire, fits inside the drum 38 and it is preformed to engage frictionally the inner surface 40. As seen more clearly in FIG. 3, one end of the ring is bent inwardly to form a finger 52 which enters the slot 26 for selective engagement with the end abutments 28 and 30. This ring 50 lies flat against the ring 18 and is held in place by means of a side plate 54 (FIGS. 2 and 3) which is bolted or otherwise secured to the drum 38. Suitable roller or needle bearings 56 support the side plate 54 on the shaft 14 for rotation. Similar bearings 58 mount a second side plate 60 for rotation on the shaft 14, this side plate 60 being secured to the opposite side of the drum 38 by means of bolts, screws, or the like. Thus, the two side plates 54 and 60 carry the drum 38 for rotation about the outer ring 18. As seen in FIG. 3, the side plates retain the bearings 24, the two rings 12 and 18, as well as the spring member 50, in assembly.

With the mechanism just described installed in an automotive torque converter, the shaft 14 is stationary and the drum 38 with the two side plates 54 and 60 rotate. As viewed in FIG. 1, the drum 38 is free to rotate clockwise, but is held against counterclockwise rotation.

Assuming that all of the parts in the mechanism are positioned as shown in FIG. 1, the drum 38 is started rotating counterclockwise, the spring or clutch member 50 being in frictional contact with the inner drum surface will rotate therewith until the finger 52 engages the end 30 of the slot 26. This results in a slight counterclockwise movement of the outer ring 18, which, because of its eccentric mounting on the ring 12, moves outwardly or off center enough to contact the inner periphery 40 of the drum. This contact is sufficient to cause further eccentric displacement of the ring 18 on the inner ring 12, resulting in the ring 18 becoming frictionally wedged between the inner drum surface 40 and the ring of spacer bearings 24 on the ring 12. This locks the drum 38 against rotation in a counterclockwise direction.

Release of this locking action is simply achieved by rotating the drum 38 clockwise, whereupon the outer ring 18 swings clockwise on the spacer bearings 24 until the end 30 of the slot 26 abuts against the stop pin 32.

The rings 12 and 18, as well as all of the other parts in the mechanism, are preferably formed of steel. Also, these rings preferably are designed to deform slightly during locking so as to grip more tenaciously the inner surface of the drum 38. Still further, by reason of the cored-out portions 46 in the drum 38, the latter will deform under load, thereby making use of the inherent resilience of the steel in the drum to add to the holding power of the brake.

What is claimed is:

1. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, a plurality of circumferential and transverse oil grooves in the facing surfaces of said drum and said second ring, a plurality of arcuate hollow sections in said drum, a resilient C-shaped friction ring frictionally engaging the inner surface of said drum and having an axially projecting finger on one end which enters said slot and is selectively engageable with said end abutments, and two side plates rotatably mounted on said shaft and secured to the opposite sides respectively of said drum, said second ring being frictionally engageable with said drum to prevent relative rotation therebetween, and said drum being radially deformable in the vicinities of said hollow sections.

2. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, a plurality of arcuate hollow sections in said drum, a resilient C-shaped friction ring concentrically engaging the inner surface of said drum and having an axially projecting finger on one end which enters said slot and is selectively engageable with said end abutments, and two side plates rotatably mounted on said shaft and secured to the opposite sides respectively of said drum, said second ring being frictionally engageable with said drum to prevent relative rotation therebetween, and said drum being radially deformable in the vicinities of said hollow sections.

3. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, a resilient C-shaped friction ring concentrically engaging the inner surface of said drum and having an axially projecting finger on one end which enters said slot and is selectively engageable with said end abutments, and two side plates rotatably mounted on said shaft and secured to the opposite sides respectively of said drum, said second ring being frictionally engageable with said drum to prevent relative rotation therebetween, and said drum being radially deformable in the vicinities of said hollow sections.

4. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, a resilient C-shaped friction ring concentrically engaging the inner surface of said drum and having an axially projecting finger on one end which enters said slot and is selectively engageable with said end abutments, and two side plates rotatably mounted on said shaft and secured to the opposite sides respectively of said drum, said drum being frictionally engageable with said second ring.

5. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, and a resilient C-shaped friction ring concentrically engaging the inner surface of said drum and having an axially projecting finger on one end which enters said slot and is selectively engageable with said end abutments, said drum being frictionally engageable with said second ring to prevent relative rotation therebetween.

6. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, a stop pin secured to and radially extending from said shaft through said first ring and entering said slot, said pin being selectively engageable with said end abutments, said second ring being rotatable with respect to said first ring, a drum having a cylindrical inner surface complementary with and rotatably encircling the outer surface of said second ring, and a member operatively mounted on said drum and frictionally engaging the inner peripheral surface of said drum and selectively engageable with the end abutments of said slot.

7. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, a plurality of needle spacer bearings interposed between the eccentric surfaces of said first and second rings, an elongated slot in the side of said second ring and having opposite end abutments, means securing said first ring against rotation with respect to said shaft, a member projecting radially outwardly from said first ring entering said slot and being selectively engageable with at least one of said end abutments, said second ring being rotatable with respect to said first ring, a drum having a cylindrical inner surface complementary with and rotatably encircling the outer surface of said second ring, a resilient C-shaped friction ring having a portion concentrically engaging the inner surface of said drum and having an axially projecting finger on one end which enters said slot and is selectively engageable with said end abutments, said second ring being frictionally engageable with said drum to prevent relative rotation therebetween whereby rotational force may be imparted from said drum to said second ring for at least one direction of drum rotation.

8. A brake comprising a stationary shaft, a first ring mounted on said shaft and having an eccentric outer peripheral surface, a second ring encircling said first ring and having an eccentric inner peripheral surface complementary to said first ring eccentric surface, said second ring having an outer peripheral surface which is concentric with respect to said shaft, an elongated slot in the side of said second ring and having opposite end abutments, means securing said first ring against rotation with respect to said shaft, a member projecting radially outwardly from said first ring entering said slot and being selectively engageable with at least one of said end abutments, said second ring being rotatable with respect to said first ring, a drum having a cylindrical inner surface complementary with and rotatably encircling the outer surface of said second ring, a resilient C-shaped friction ring concentrically engaging the inner surface of said drum and having an axially projecting finger on one end which enters said slot and is selectively engageable with said end abutments, said second ring being frictionally engageable with said drum to prevent relative rotation therebetween.

9. A brake comprising a member having an outer surface which is eccentric with respect to an imaginary axis, a ring encircling said member and having an eccentric inner peripheral surface which is complementary to the eccentric surface of said member, said inner and outer eccentric surfaces being adjacent to each other, said member and said ring being selectively engageable and relatively movable with respect to each other and about said axis, two circumferentially spaced abutments on said ring, a stop projecting from said member and entering the space between said two abutments, said stop being selectively engageable with said abutments to provide for only limited relative movement between said member and said ring, a drum contiguously encircling said ring, said drum being selectively rotatable and frictionally engageable with the outer surface of said ring, and an actuating member operatively mounted on said drum frictionally engaging said drum and having a portion selectively engageable with said abutments to hold said actuating member against rotation with respect to said drum.

10. A brake comprising a member having an outer surface which is eccentric with respect to an imaginary axis, a ring encircling said member and having an eccentric inner peripheral surface which is complementary to the eccentric surface of said member, said inner and outer eccentric surfaces being adjacent to each other, said member and said ring being selectively engageable and relatively movable with respect to each other and about said axis, means interposed between said member and said ring limiting the relative movement therebetween, a drum contiguously encircling said ring, said drum being selectively rotatable and frictionally engageable with the outer surface of said ring, and additional means frictionally connecting said drum to said ring which tends to rotate said ring with said drum for at least one direction of drum rotation, said additional means including an element mounted in sliding contact with said drum, said element having a portion engageable with said ring for imparting movement to the latter.

11. A brake comprising a member having an outer surface which is eccentric with respect to an imaginary axis, a ring encircling said member and having an eccentric inner peripheral surface which is complementary to the eccentric surface of said member, said inner and outer eccentric surfaces being adjacent to each other, said member and said ring being selectively engageable and relatively movable with respect to each other and about said axis, means interposed between said member and said ring limiting the relative movement therebetween, a drum contiguously encircling said ring, said drum being selectively rotatable and frictionally engageable with the outer surface of said ring, and actuating means responsive to rotation of said drum in one direction to impart corresponding rotation to said ring and responsive to rotation of said drum in the other direction to provide relative rotation between said ring and said drum, said actuating means including an element mounted in sliding contact with said drum, said element having a portion engageable with said ring for imparting movement to the latter, said actuating means further including a stop mounted on said member engageable with an abutment on said ring when the latter rotates in said other direction.

References Cited in the file of this patent

UNITED STATES PATENTS

| | | |
|---|---|---|
| 267,638 | Wright | Nov. 14, 1882 |
| 1,221,390 | Tabulo | Apr. 3, 1917 |
| 1,847,714 | Gillies | Mar. 1, 1932 |
| 1,940,275 | Siewek | Dec. 19, 1933 |

FOREIGN PATENTS

| | | |
|---|---|---|
| 1,052,962 | France | Sept. 30, 1953 |